Feb. 7, 1967   C. W. ROBINSON   3,302,884
SELF-TRIMMING ABLATIVE NOZZLE
Filed Sept. 16, 1963
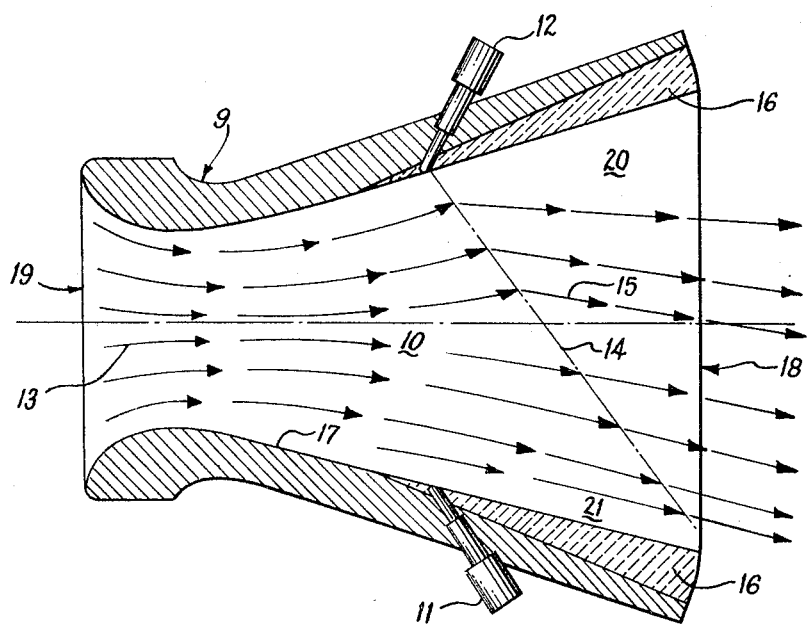
INVENTOR.
CURTISS W. ROBINSON
BY
AGENT

United States Patent Office 3,302,884
Patented Feb. 7, 1967

3,302,884
SELF-TRIMMING ABLATIVE NOZZLE
Curtiss W. Robinson, Seattle, Wash., assignor to The Boeing Company, Seattle, Wash., a corporation of Delaware
Filed Sept. 16, 1963, Ser. No. 308,961
5 Claims. (Cl. 239—265.15)

This invention relates to apparatus for correcting rocket nozzle misalignment and more particularly to a rocket nozzle having an exhaust gas flow deflector in combination with an ablative inner nozzle surface.

It has been proopsed in the prior art to steer a reaction propulsion engine by controlling the direction of the fluid discharging from the engine through the nozzle. The need for this steering may arise from misalignment of the nozzle or from other sources and these misalignment induced torques are generally referred to as trim. While various schemes have been suggested to trim out the misalignment moments to center the resultant thrust vector employing mechanical devices positioned in the exhaust gas jet, the extreme gas temperature and velocity in the nozzle exit area have produced complicated and inefficient mechanisms. A more effective scheme for turning exhaust gases, useable in the supersonic diffuser portion of a nozzle, has been the injection of a fluid into the main gas stream to establish an oblique shock wave across the nozzle. The exhaust gases passing through the shock wave are deflected and the resultant exhaust gas jet direction is changed. However, difficulty with the latter scheme has been encountered due to the high weight penalties associated with the provision of a sufficient fluid supply aboard the vehicle to continuously maintain the shock wave by injection. This is prohibitive not withstanding that some thrust is provided by the addition of the injection fluid since greater propulsive efficiency could be obtained by introducing any additional fluid carried by the vehicle into the combustion chamber itself.

It is also known in the prior art that the nozzle exit cone of a reaction propulsion engine may be constructed so that an ablative liner, i.e. one which erodes in relation to the velocity of gas passing thereby, on the nozzle inner surface is gradually worn away during firing of the engine. One purpose for which ablative material coating may be used is to adjust the nozzle expansion ratio to an optimum value by allowing the erosion of the ablative material near the nozzle exit area as the vehicle moves into thinner air.

The present invention provides a reaction propulsion engine nozzle comprising the novel combination of an ablative coating in the exit cone of the nozzle which increases in thickness rearwardly together with mechanical vanes or fluid injectors, located forward of the ablative material. This combination provides a means for deflecting the exhaust jet and simultaneously eroding a particular area of the ablative material whereby the trimming moment produced by the vanes or injectors may be reduced as the ablation increases since the latter changes the direction of the exhaust gas and complements the vanes or injectors as a deflection means.

In accordance with the foregoing it is an object of this invention to provide a self trimming ablative nozzle with a variable expansion exit cone.

Another object of the invention is to provide a nozzle embodying a novel combination of an exhaust gas deflector means with an ablative coated inner nozzle surface whereby operation of the gas deflector means will concentrate uniform erosion of the coating in the area where gas flow remains in contact with the ablative surface as compared to the area from which the gas flow has been deflected away.

A further object of the invention is to provide a nozzle comprising fluid injectors one of which can establish an oblique shock wave in the nozzle exit cone so as to deflect the gas passing therethrough whereby erosion of the ablative coating rearward of the injector which is operative decreases so as to change the exhaust gas jet direction and thus allow the weight rate of flow through the fluid injector to be decreased.

Other objects and many attendant advantages of the present invention will become apparent as the same becomes better understood from the following detailed description had in conjunction with the annexed drawing wherein:

The drawing shows a longitudinal view in section of a reaction propulsion engine nozzle embodying the present invention, one nozzle injector being seen in its operative condition.

Referring now to the drawing, there is shown at 9 a reaction propulsion engine nozzle having divergent side walls 10 and having two injectors 11 and 12. It is to be understood that any number of fluid injectors may be positioned about the periphery of the nozzle depending upon the desired accuracy of trimming. Moreover, mechanical or any suitable gas deflection means may be provided and in fact would be required if exhaust gas velocity was subsonic. The injectors 11 or 12 may be of a type well known in the art and the fluid which is injected into the nozzle may be either a gas or a liquid drawn from a fluid supply tank (not shown) located aboard the vehicle (not shown). Operation of the injectors 11 or 12 is controlled by a system (not shown) which senses nozzle misalignment induced motions. The untrimmed condition may be corrected by changing the direction of the exhaust gas jet 13.

To change the jet direction, fluid is introduced through the appropriate injector, such as 12, located in the supersonic portion of the nozzle, which produces an oblique shock wave 14, attached at the point of injection, in the exhaust gas 13. The direction of the gas flow 13 as it passes through the shock wave 14 will be deflected and result in a gas flow direction 15. Since the jet of exhaust gas is changed in direction, a torque is produced to correct the untrimmed condition and thereby to center the resultant thrust vector.

An ablative material 16 such as graphite cloth phenolic or fiber glass cloth phenolic is bonded or coated on the nozzle divergent side walls 17 downstream of the fluid injectors 11, 12. The radial thickness of the ablative coating 16 increases rearwardly and is uniformly distributed at a given section of the nozzle. When the vehicle is trimmed so as to require no correcting moments the exhaust gas 13 will erode the ablative material 16 uniformly and symmetrically about the nozzle axis. This will increase the nozzle exit cross-sectional area 18 with respect to the nozzle throat area 19 and thereby change the nozzle expansion ratio. Since a rocket powered vehicle will generally increase in altitude with continued firing and the ambient air pressure at higher altitude decreases, the increase in nozzle area ratio will produce a more optimum expansion ratio.

When the injector 12 is operated so as to establish the shock wave 14 and produce a gas flow direction 15 rearward of the shock wave, gas flow in a portion 20 of the nozzle divergent walls 10 behind the injector 12, is reduced. The constant gas flow on the portion 21 forward of the shock wave 14, however, will increase and will continue to erode the ablative material 16. This difference in ablation rate over the areas 20 and 21 will result in an exit area 18 which is not symmetrical with respect to the axis of the nozzle 9. Since the exhaust gas flow which exits from the now unsymmetrical cross-sectional area 18 will have a resultant thrust vector direction which is not collinear with the nozzle axis, a moment will be produced and this moment will be supplementary to the moment established by the deflection of the exhaust gas through the shock wave. As the unsymmetrical area increases and the concomitant trimming moment due to the change in vector direction produced by the unsymmetrical exit area becomes larger, the moment produced by the shock wave may be decreased until the unsymmetrical area produced moment provides a sufficient trimming torque to compensate for the misalignment induced torque. In other words, the nozzle thrust vector which was misaligned may be centered by producing an unsymmetrical nozzle exit area which alone can provide a compensating thrust vector so as to center the resultant nozzle thrust vector. It is thus seen that a nozzle misalignment or other source of vehicle untrimming may be rectified without continuous fluid flow through the appropriate injectors. This results in a lesser fluid supply required to trim the vehicle and therefore greater propulsive efficiency, since a lesser supply of injector fluid is required to be carried by the vehicle.

While there has been shown and described the fundamental novel features of this invention as applied to the preferred embodiment, it will be understood that various omissions and substitutions and changes in the form and details of the device illustrated and in its operation may be made by those skilled in the art without departing from the spirit of the invention. It is the intention therefore to be limited only by the scope of the following claims and reasonable equivalents thereof.

I claim:
1. A reaction propulsion engine nozzle through which a jet of exhaust gas is adapted to pass having divergent side walls of relatively non-ablative material comprising in combination:
    (a) jet deflector means connected to the divergent side walls for variably changing the direction of the exhaust gas jet within the nozzle, and
    (b) ablative material attached to the inner surface of said walls downstream of said jet deflector means and exposed to said exhaust gas jet, whereby deflection of the exhaust gas causes unsymmetrical and uniform erosion of said ablative material thereby centering the resultant nozzle thrust vector.
2. The reaction propulsion engine nozzle of claim 1 wherein the ablative material increases in radial thickness in a downstream direction.
3. A reaction propulsion engine nozzle through which a jet of exhaust gas at supersonic velocity is adapted to pass having divergent walls of relatively non-ablative material comprising in combination:
    (a) at least one fluid injector mounted in said divergent walls for establishing an oblique shock wave and changing the direction of the exhaust gas jet within the nozzle, and
    (b) ablative material attached to the inner surface of said walls downstream of said at least one fluid injector and exposed to said exhaust gas jet, whereby deflection of the exhaust gas causes unsymmetrical erosion of said ablative material thereby centering the resultant nozzle thrust vector.
4. The reaction propulsion engine nozzle of claim 3 wherein the ablative material increases in radial thickness in a downstream direction.
5. A reaction propulsion engine nozzle through which a jet of exhaust gas at supersonic velocity is adapted to pass having divergent walls of relatively non-ablative material comprising in combination:
    (a) means for injecting fluid interiorly within said nozzle for establishing an oblique shock wave and changing the direction of the exhaust gas jet within the nozzle, and
    (b) ablative material attached to the inner surface of said walls downstream of said fluid injecting means and exposed to said exhaust gas jet and adapted so as to permit the unsymmetrical and uniform erosion of said material when a shock wave is established by said fluid injecting means and thereby center the resultant nozzle thrust vector.

References Cited by the Examiner

UNITED STATES PATENTS

| | | | |
|---|---|---|---|
| 2,916,873 | 12/1959 | Walker | 60—35.54 |
| 3,048,972 | 8/1962 | Barlow | 60—35.6 |
| 3,129,560 | 4/1964 | Prosen | 60—35.6 |
| 3,132,478 | 5/1964 | Thielman | 60—35.54 |
| 3,184,916 | 5/1965 | Ravel | 60—35.6 |
| 3,253,405 | 5/1966 | Hayes | 60—35.6 |

MARK NEWMAN, *Primary Examiner.*

A. L. SMITH, *Assistant Examiner.*